United States Patent
Bujak et al.

(10) Patent No.: US 9,187,010 B2
(45) Date of Patent: Nov. 17, 2015

(54) METHOD AND SYSTEM FOR DETECTING OCCUPANT SEAT WEIGHT SENSOR MEASUREMENT ERROR

(75) Inventors: Chris Bujak, New Baltimore, MI (US); Abraham Philip, Rochester Hills, MI (US); Christopher Griffin, Allen Park, MI (US)

(73) Assignee: Ford Global Technologies, Dearborn, MI (US)

( * ) Notice: Subject to any disclaimer, the term of this patent is extended or adjusted under 35 U.S.C. 154(b) by 2979 days.

(21) Appl. No.: 10/993,493

(22) Filed: Nov. 18, 2004

(65) Prior Publication Data

US 2006/0106517 A1    May 18, 2006

(51) Int. Cl.
*E05F 15/00* (2015.01)
*B60N 2/00* (2006.01)

(52) U.S. Cl.
CPC ....................................... *B60N 2/002* (2013.01)

(58) Field of Classification Search
CPC ........................................................ B60N 2/002
USPC .................... 180/271–273; 280/801.1, 801.2, 280/802–808; 701/29–36, 45–47; 177/25.12, 26, 45–48, 144, 200; 340/667
See application file for complete search history.

(56) References Cited

U.S. PATENT DOCUMENTS

| | | | |
|---|---|---|---|
| 3,494,437 A * | 2/1970 | Fathauer | 177/200 |
| 6,578,870 B2 * | 6/2003 | Winkler et al. | 280/735 |
| 6,636,792 B2 * | 10/2003 | Lichtinger et al. | 701/45 |
| 7,009,502 B2 * | 3/2006 | Breed et al. | 340/436 |
| 7,024,294 B2 * | 4/2006 | Sullivan et al. | 701/45 |
| 7,039,514 B2 * | 5/2006 | Fortune | 701/45 |
| 2002/0043789 A1 * | 4/2002 | Lichtinger et al. | 280/735 |
| 2002/0125051 A1 | 9/2002 | Aoki | |
| 2002/0129986 A1 * | 9/2002 | Aoki | 180/268 |
| 2003/0040858 A1 * | 2/2003 | Wallace | 701/45 |
| 2003/0074121 A1 * | 4/2003 | Sakai et al. | 701/45 |
| 2004/0008119 A1 * | 1/2004 | Sakai et al. | 340/667 |
| 2004/0016577 A1 * | 1/2004 | Lichtinger et al. | 177/144 |
| 2004/0080425 A1 | 4/2004 | Sullivan et al. | |
| 2004/0108146 A1 * | 6/2004 | Rundell et al. | 177/144 |
| 2005/0194779 A1 * | 9/2005 | Ito et al. | 280/801.1 |

* cited by examiner

*Primary Examiner* — Redhwan K Mawari
*Assistant Examiner* — Rodney P King
(74) *Attorney, Agent, or Firm* — Jerome R. Drouillard; Frank MacKenzie

(57) ABSTRACT

A vehicle system includes a vehicle occupant seat including at least two weight sensors coupled to the seat for generating weight signals. The system further includes an electronic control unit (ECU) including an occupant classification algorithm for generating an occupant classification signal as a function of the weight signals. The electronic control unit further includes variant signal metrics for generating an error signal as a function of comparing the weight signals.

1 Claim, 2 Drawing Sheets

METHOD AND SYSTEM FOR DETECTING OCCUPANT SEAT WEIGHT SENSOR MEASUREMENT ERROR

TECHNICAL FIELD

The present invention relates generally to vehicle safety systems and, more particularly, to a method and apparatus for detecting occupant seat weight sensor measurement error.

BACKGROUND OF THE INVENTION

Advanced air bag requirements have resulted in the implementation of passenger occupant classification sensors. Two current occupant classification sensor systems are structure based sensor systems and bladder systems.

Structure-based occupant classification sensor systems include sensors designed in the lower seat structure or seat base, whereas bladder systems are non-structure based and include bladders placed between seat foam and a seat pan. Structure-based systems measure the weight on the seat (including bottom and back cushions) for determining a classification for the front-seat passenger occupant, for example, child, adult, etc., and can also be used for determining a classification for the driver occupant, for example, small adult ($5^{th}\%$), medium adult ($50^{th}\%$), and large adult ($95^{th}\%$).

For these systems properly to measure occupant weight, the seat must not contact any adjacent systems (e.g. center console, door panel) and should be unconstrained. Occupant classification sensor system measured error results from adjacent system contact with the seat and is usually measured in pounds or kilograms. Most of the above specified adjacent system contacts produce only small amounts of occupant classification sensor measurement error.

Large errors may be generated, however, when a vehicle power seat is motored or driven into or onto an object that stops the seat movement prior to normal seat travel, and the seat motor continues to apply a force into the seat structure. Examples of items that may cause these measured errors include: a power seat lowered onto an object stuck under the seat and fore or aft seat movement into an object directly behind the seat (e.g. cargo behind the seat). These large measured weight errors can lead to improper occupant classification and improper pyrotechnic deployment strategies.

Similar difficulties also exist for manual seats where the operator adjusts the seat, which induces forces on the seat structure as a result of contacting objects. These forces generally result in system measurement error.

Therefore, it would be desirable to provide an improved occupant weight detection system to decrease the probability of improper safety device response.

SUMMARY OF THE INVENTION

In one aspect of the invention, a vehicle system includes a vehicle occupant seat including at least two weight sensors coupled to the seat for generating weight signals. The system further includes an electronic control unit (ECU) including an occupant classification algorithm for generating an occupant classification signal as a function of the weight signals. The electronic control unit further includes variant signal metrics for generating an error signal as a function of comparing the weight signals.

In a further aspect of the invention, a method for detecting weight-sensor error includes generating four sensor signals and comparing the signals to a predetermined expected variance minimum of a functional sensor. The method further includes comparing expected gradients of the sensor signals to a minimum expected gradient of a functional sensor and comparing maximum expected negative weight of a non-constrained sensor with expected magnitude in the sensor signals. An error signal is generated in response to an indication of a constrained seat, as determined by the aforementioned comparisons.

Accordingly, an advantage of the present invention is that it provides a software logic that detects occupant classification sensor system measured error and thereby reduces potential safety system misfires.

Other advantages and features of the present invention will become apparent when viewed in light of the detailed description of the preferred embodiment when taken in conjunction with the attached drawings and appended claims.

DETAILED DESCRIPTION

Figure 1:
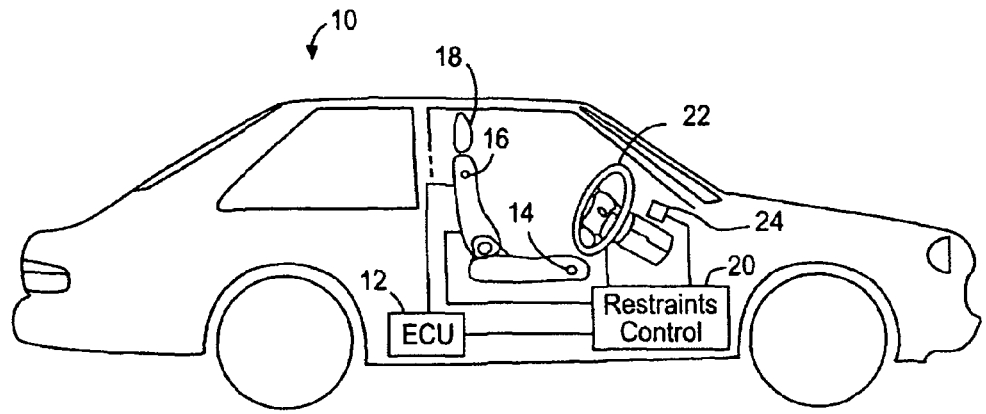
FIG. 1 is a system view of a host vehicle in accordance with one embodiment of the present invention.

In the drawing figures discussed as follows, the same reference numerals will be used to illustrate the same components. While the present invention is described with respect to a particular method and apparatus for weight-sensor error detection, various adaptations will be evident to those skilled in the art.

Referring to FIG. 1, a vehicle system 10 including an electronic control unit (ECU) 12 is illustrated in accordance with one embodiment of the present invention. The system 10 further includes at least one seat sensor 14 or 16 (coupled to a vehicle seat 18) and a restraints control module 20. The sensors 14 and 16 and the restraints control module 20 are electrically coupled to the electronic control unit 12. The restraints control module 20 is also coupled to various vehicle restraint and safety systems such as, for example, seatbelt pre-tensioners 19, airbags 22, and warning lamps 24.

Figure 2:
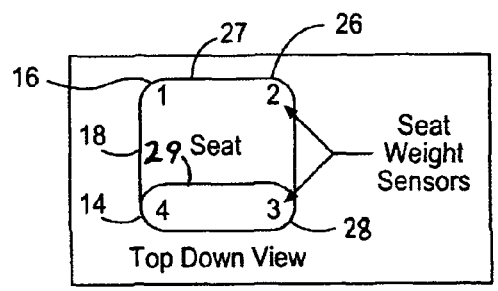
FIG. 2 is a top view of a sensor arrangement for the driver or passenger seat of FIG. 1.

Referring to FIG. 2, one embodiment of a sensor arrangement in accordance with the present invention is illustrated. The embodied seat 18 includes four seat sensors (first 16 and second 26 coupled to a base 27, and third 28 and fourth 14 coupled to a back 29) labeled 1, 2, 3, and 4. The sensors are arranged such that sensor variance on one side of the seat 18 can be measured against the other side of the seat 18. Alternate embodiments may include a single sensor, comparing data to predetermined expected variance, or a plurality of sensors.

Figure 3:
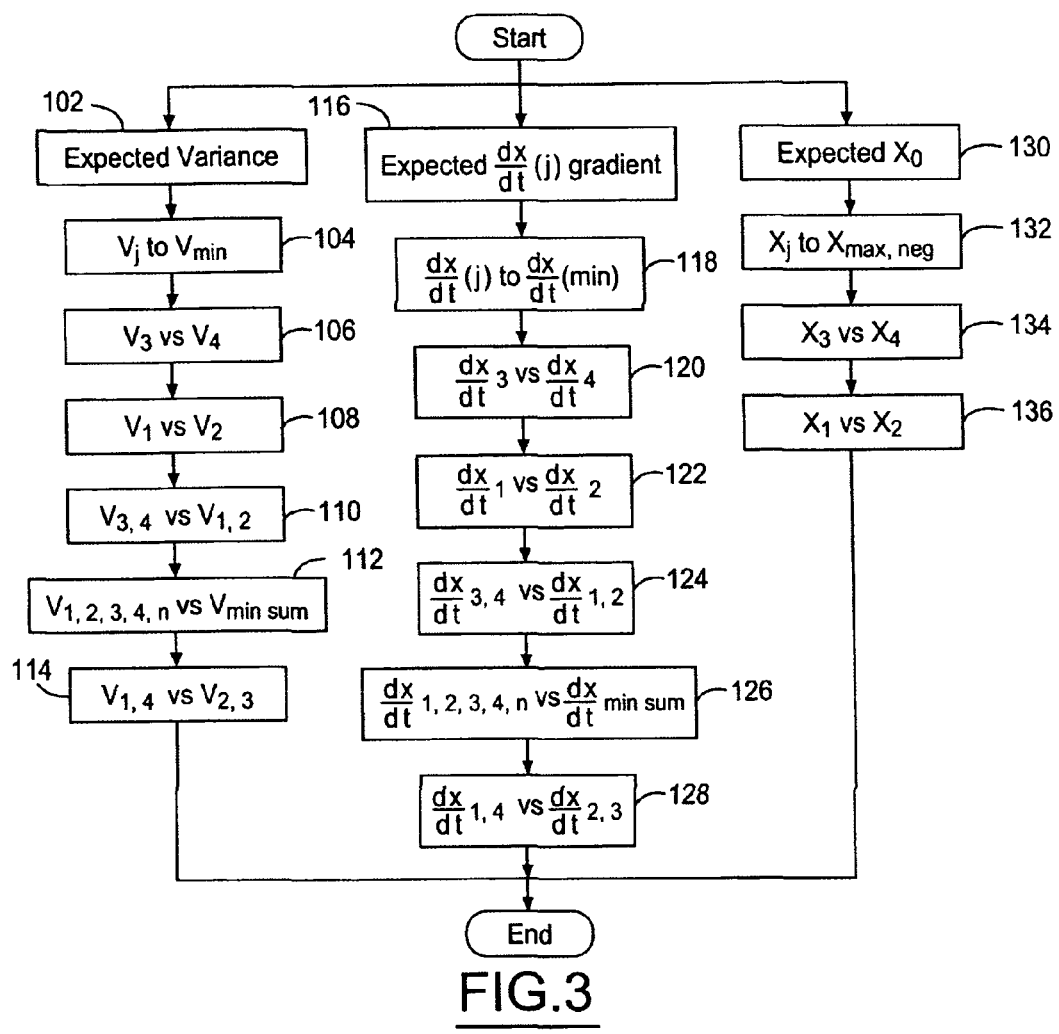
FIG. 3 is a logic flow diagram of within the control system of FIG. 1 in accordance with another embodiment of the present invention.

Referring to FIG. 3, the electronic control unit 12 includes logic 100 for determining seat weight sensor error as a function of the seat weight sensors 14, 16, 26, and 28. The logic includes variant signal metrics for performing a mathematical sensor signal analysis on each of the sensors (14, 16, 26, 28) by comparing individual sensor response against an expected minimum response and against the other weight sensors in the seat 18.

The variant signal metrics logic includes the following three metrics for determining whether a constrained seat system exists (i.e. whether a seat system is generating error signals or is operated poorly). The three metrics include, in operation block 102, expected variance (V) in the weight sensor signals; in operation block 116, expected $dx/dt*(j)$ gradient (rate of change per time (t)) in the weight sensor signals; and, in operation block 130, expected magnitude (X) in the weight sensor signals.

In operation block 102 the expected variance (V) in the weight sensor signals algorithm is activated.

In operation block 104 each sensor Vj (where j=1, 2, 3, 4, sensor element n) is compared against a minimum (Vmin) expected variance of a functional sensor. This comparison is the logic determination as to whether any sensor is stuck.

In operation block 106 V3 is compared to V4. This logic functions as a determination as to whether an object is constraining any corner of the seat 18 by comparing the variance of the seatback pairs of sensors 14, 18.

In operation block 108 V1 is compared to V2. This logic determines if there is an object constraining any corner of the seat 18 by comparing the variance of the front pairs of sensors 16, 26.

In operation block 110 V3,4 is compared to V1,2. This logic determines if there is an object constraining the front or back of the seat by comparing the variance of one of the pairs of sensors against the opposite pair of sensors.

In operation block 112 V1,2,3,4,n are compared to a minimum expected variance of a seat sensor system (Vminsum). This logic determines if there an object pushing and/or constraining the seat 18 by summing the variance of all the sensors (V1,2,3,4,n) and comparing the sum against a minimum expected variance of a seat sensor system.

In operation block 114 V1,4 is compared to V2,3. This logic determines if there is an object constraining either the left or right side of the seat 18 by comparing the variance of the pairs of sensors on one side 16, 14 against the opposite pair of sensors 26, 28.

In operation block 116, logic starts for expected gradient $dx/dt*j$ (rate of change per time (t)) in the weight sensor signals.

In operation block 118 $dx/dt*j$ to $dx/dt*(min)$. In other words, each sensor magnitude Xj (where j=1, 2, 3, 4, sensor element n) is compared against a minimum expected gradient $dx/dt*(min)$ of a functional sensor, thereby determining if any sensor is stuck.

In operation block 120, $dx/dt*3$ is compared to $dx/dt*4$. This logic functions as a determination as to whether an object is constraining any corner of the seat 18 by comparing the gradients of the seatback pair of sensors 14 and 28.

In operation block 122 $dx/dt*1$ is compared to V2. This logic determines if there is an object constraining any corner of the seat 18 by comparing the gradients of the front pairs of sensors 16, 26.

In operation block 124 $dx/dt*3$, $dx/dt*4$ is compared to $dx/dt*1$, $dx/dt*2$. This logic determines if there is an object constraining the front or back of the seat by comparing the gradient of one of the pairs of sensors against the opposite pair of sensors.

In operation block 126 $dx/dt*1,2,3,4,n$ are compared to a minimum gradient of a seat sensor system (dx/dtminsum). Operation block 126 determines if there an object pushing and, possibly, constraining the seat 18 by summing the gradients of all the sensors (V1,2,3,4,n) and comparing the sum against a minimum expected gradient of a seat sensor system.

In operation block 128 $dx/dt*1$, $dx/dt*4$ is compared to $dx/dt*2$, $dx/dt*3$. This operation determines if there is an object constraining either the left or right side of the seat 18 by comparing the gradients of the pairs of sensors on one side 16, 14 against the opposite pair of sensors 26, 28.

In operation block 130 logic starts for analyzing expected magnitude (X) in the weight sensor signals.

In operation block 132 each sensor Xj (where j=1, 2, 3, 4, sensor element n) is compared against a maximum expected negative weight of a non-constrained sensor (Xmax neg). A seat occupant does not cause a negative weight measurement on the seat sensors greater than an expected Xnormal neg value; therefore negative weight measurement (Xmax neg) is abnormal and an indicator that an object is forcing the seat 18 upward.

In operation block 134, X3 is compared to X4 for determining whether an object is constraining any corner of the seat 18 by comparing the distribution of weight in the rear pair of sensors 14 and 28.

In operation block 136, X1 is compared to X2 for determining whether there is an object constraining any corner of the seat 18 by comparing the distribution of weight in the front pair of sensors 16 and 26.

In another embodiment of the present invention, the system 10 analyzes the vehicle speed (available from, for example, a vehicle CAN bus) to include the expected contribution of vehicle motion to the variance of the sensors data.

An unconstrained seat system (seat not contacting any adjacent systems) has an expected occupant classification sensors weight measurement response to the occupant weight, empty seat conditions, and dynamic inputs induced from the vehicle movement. By analyzing the occupant classification sensors output response (or lack thereof), the logic detects the interaction with objects against the seat 18 and resulting occupant classification sensors measurement error. The variant signal metrics logic operates as a function of the fact that when the seat is constrained by an object (under seat, behind the seat, etc.), the sensor output response characteristics change accordingly because the seat/occupant classification sensors weight sensor is no longer able to move freely (i.e. sensor response is dampened).

A normally operating sensor will generate data including an amount of expected variation; and when the vehicle 10 is moving, the amount of variation in data increases. For example when an object is trapped under the seat 18 the sensors sense a negative weight (i.e. objects pushing up on the seat), whereas the occupant sitting on the seat causes a positive weight. The data has insignificant signal variation (the seat cannot freely move).

Negative weight, lack of variation on the data, and vehicle speed confirmation (a moving vehicle will always induce motions onto the occupant and cause additional fluctuations in the individual sensors) are indicators that the seat weight measurement data is in error. Once this error condition is recognized, the vehicle operator is alerted via a warning lamp 24.

Figure 4:
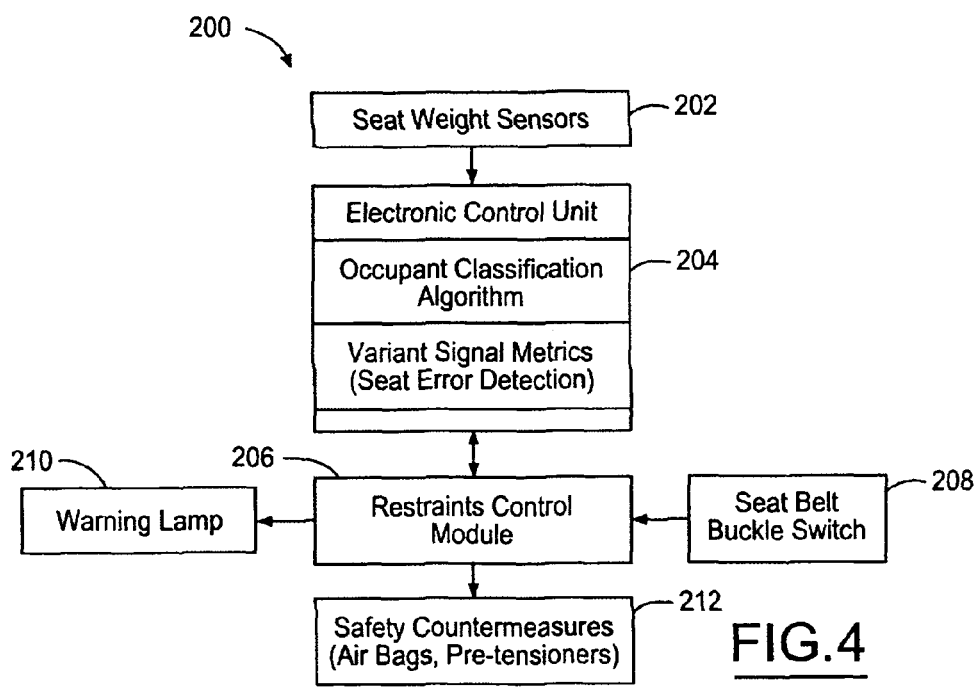
FIG. 4 is a flow chart of the operation of the system of FIG. 1 in accordance with another embodiment of the present invention.

Referring to FIG. 4, a block diagram 200 of the system 10 is illustrated in accordance with another embodiment of the present invention. Operations start in system block 202 where seat sensor signals are generated from seat sensors as a function of load on the seat.

In system block 204, the electronic control unit receives the sensor signals and runs the variant signal metrics, discussed regarding FIG. 3, and an occupant classification algorithm. The Occupant classification algorithm determines the general size and shape of the seat occupant and the variant signal metrics determine if the size and shape determinations are in error.

In system block 206, restraints control module 20 receives size, shape, and size and shape error signals and generates appropriate warning lamp signals and safety countermeasure signals. If an error signal indicates that the seat is constrained, restraints control module 20 will disregard occupant size and shape classification signals, and the warning lamp signals and countermeasure signals will be issued accordingly. Restraints control module 20 further generates the aforementioned signals as a function of whether the seat belt is engaged in response to seat belt switch signals from system block 208.

In system block 210 the warning lamp is activated; and in operation block 212 counter measures, such as air bags and seatbelt pre-tensioners are activated.

In operation, a method for detecting weight sensor error includes generating a first sensor signal from the first weight sensor; generating a second sensor signal from the second weight sensor; generating a third sensor signal from the third weight sensor; generating a fourth sensor signal from the fourth weight sensor; comparing expected variance of the first sensor signal, the second sensor signal, the third sensor signal, and the fourth sensor signal to a predetermined expected variance minimum of a functional sensor; comparing expected gradients of the first sensor signal, the second sensor signal, the third sensor signal, and the fourth sensor signal to a minimum expected gradient of a functional sensor; comparing maximum expected negative weight of a non-constrained sensor with expected magnitude in the first sensor signal, the second sensor signal, the third sensor signal, and the fourth sensor signal; and generating an error signal in response to an indication of a constrained seat generated as a function of at least one of the step of comparing expected variance, the step of comparing expected gradients, and the step of comparing maximum expected negative weight.

While particular embodiments of the invention have been shown and described, numerous variations and alternate embodiments will occur to those skilled in the art. Accordingly, it is intended that the invention be limited only in terms of the appended claims.

What is claimed is:

1. A vehicle system having a vehicle occupant seat, said vehicle system comprising:
 a first weight sensor coupled to said seat and operable to generate a first weight signal;
 a second weight sensor coupled to said seat and operable to generate a second weight signal; and
 an electronic control unit (ECU) coupled to said first weight sensor and said second weight sensor;
 wherein said ECU is operable to execute an occupant classification algorithm for generating an occupant classification signal as a function of said first weight signal and said second weight signal, and said ECU includes variant signal metrics for generating an error signal as a function of comparing said first weight signal to said second weight signal, with said vehicle system further comprising a restraints control module that is coupled to said ECU and operable to activate vehicle safety systems as a function of at least one of said occupant classification signal and said error signal, and wherein said restraints control module is operable to disregard said occupant classification signal when said error signal indicates that said seat is constrained, wherein said ECU is operable to compare said first weight signal to said second weight signal by comparing expected gradients of said first weight signal and second weight signal to a minimum expected gradient of a functional sensor.

* * * * *